N. D. FAIRBANKS.
SNARE.
APPLICATION FILED MAR. 2, 1920.
1,402,753.
Patented Jan. 10, 1922.
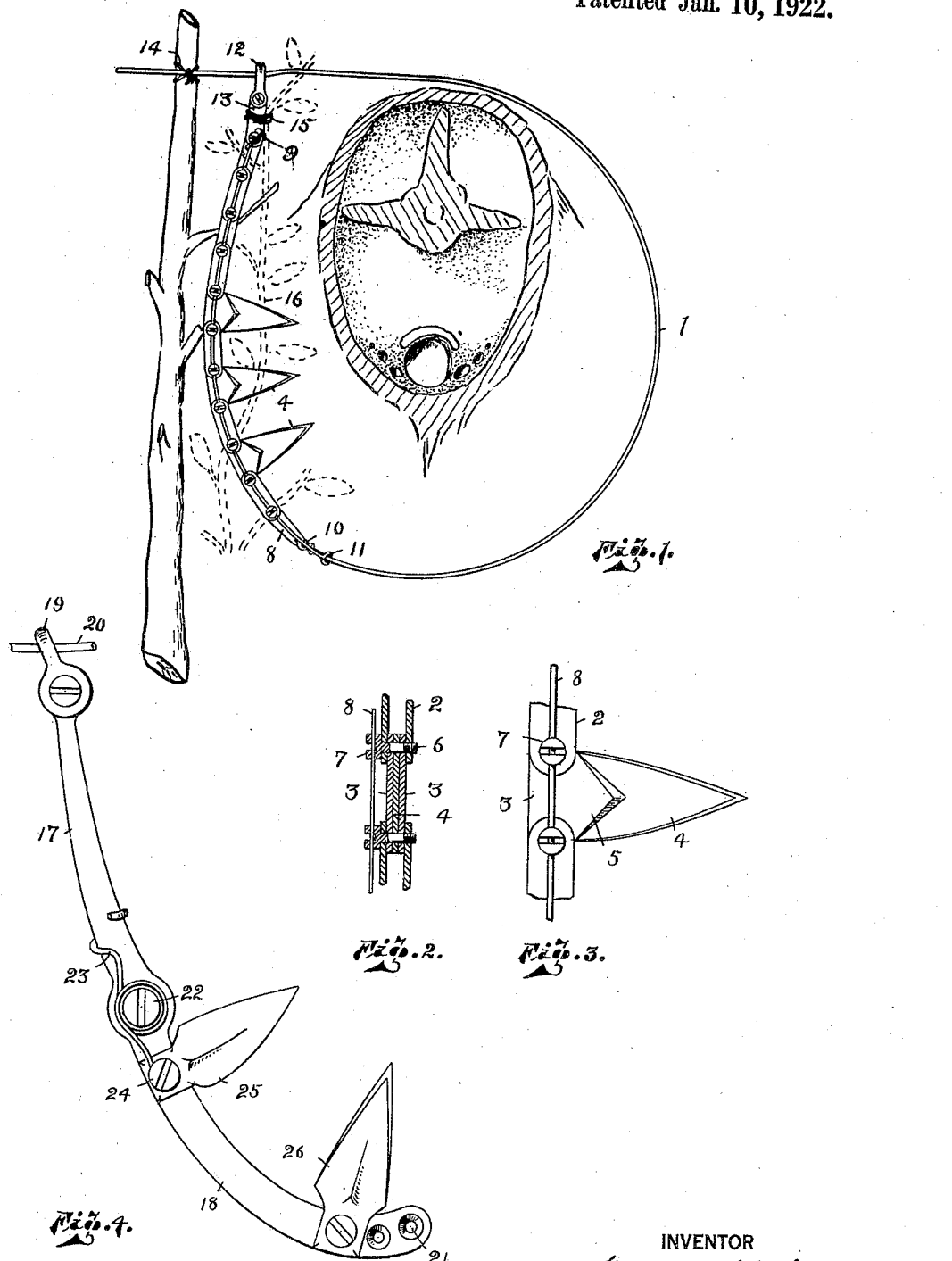
INVENTOR
Norman D Fairbanks
BY
Theo Stevens
ATTORNEY

UNITED STATES PATENT OFFICE.

NORMAN D. FAIRBANKS, OF GOODLAND, MINNESOTA.

SNARE.

1,402,753.  Specification of Letters Patent.  Patented Jan. 10, 1922.

Application filed March 2, 1920. Serial No. 362,870.

*To all whom it may concern:*

Be it known that I, NORMAN D. FAIRBANKS, citizen of the United States, residing at Goodland, in the county of Itasca and State of Minnesota, have invented certain new and useful Improvements in Snares, of which the following is a specification, reference being had therein to the accompanying drawing.

This invention relates to means for catching animals such as wolves, foxes or the like and has special reference to certain improvements in snares for such purpose.

The principal object of the invention is to provide means in connection with a wire or other flexible slip noose or snare that will result in an animal being immediately killed when caught.

Other objects and advantages of the peculiar construction of the invention will appear in the further description thereof.

Referring to the accompanying drawings forming part of this application and in which like reference characters indicate like parts:

Fig. 1 is an elevation of one of my improved snares as it would appear set for engaging an animal the neck of the latter shown in cross section therein.

Fig. 2 is an enlarged transverse sectional view longitudinally of one of the cutting blade-carrying links of the chain employed in the construction of the snare.

Fig. 3 is an enlarged side elevation of one of the cutting blades on the chain.

Fig. 4 is an enlarged view of a modified form of pivotal section of the snare.

1 represents the wire of which the snare is made and may be of any desired size or strength depending upon the size of the animal which is to be caught and to the end of which, in the preferred form, a plurality of pivotally united links such as are found in the common link belt chain are attached said chain being formed of a plurality of longitudinally spaced single piece inner links pivotally united by oppositely spaced side or outer links, the latter being indicated at 2 and the former at 3, though in the preferred structure as here shown I propose to have the inner links built up of three members, the outer ones of which are indicated at 3 and the inner ones at 4. The outer members 3 have tooth-like projections 5 which act as side braces or supports to the cutting blade 4 which is made of a single flat piece suitably sharpened for the sticking and bleeding of an animal caught in the snare.

There may be within each snare a plurality of such bleeding knives and the latter may be of any desired shape for the purpose intended. If preferred the inner or intermediate links could be made of a solid piece of metal having the bleeding knives formed integral therewith. However the built up structure is preferred, if for no other reason than convenience in sharpening and removing or replacing the knives in the event of breakage, this latter being found to occur occasionally when a large animal is caught.

In the structure referred to, the usual large headed tap-screws or bolts 6 are employed and which are held in place by being screw threaded into the side member 2 of the outermost links opposite to that impinged by the heads, and through the head 7 of each bolt and longitudinally of the chain is formed a small hole into which is inserted the spring wire 8, it being fastened against accidental dislodgment by the upper end thereof, being bound or fastened in any desired manner as at 9 to one of the uppermost tap-bolts preferably the extreme uppermost one of the chain section. This wire is so shaped either before or after being assembled with the chain as to hold the latter in the desired curved position when in suspension forming part of the snare loop.

The snare wire 1 is attached to the end center link as at 10 and I prefer to terminate the free end of the spring wire 8 in a loop indicated at 11 through which the snare wire 1 freely passes, which will assist in preventing an abrupt angle occurring at the connection of the wire with the end of the chain, the connection and loop 10 and 11, respectively being spaced apart for such purpose. The body portion of the wire 1 is passed through the clevis 12 which is pivotally connected to the last link 13 of the opposite end of the chain section and snare wire and towards the center of which the sticking or bleeding knives 4 normally point.

As a preferred form of suspending the snare I employ a conveniently positioned upstanding natural bush, or a twig cut for the purpose, unattractively positioned at the side of the runway of the animal to be caught, and suspend the snare thereupon as by a small lashing of copper wire or the like indicated at 14. The holding end of the snare wire is fastened to any suitable anchorage such as an adjacent tree, stone or the like so that it cannot be dislodged by an animal caught, as is obvious.

As a camouflage for the chain section of the snare and the sticking knives I employ preferably a small elastic band indicated at 15 slipped about the upper end of the chain section, between which and the chain a suitable twig or branch which harmonizes with the immediately surrounding vegetation may be suspended and thus effectually disguise that portion of the snare, and I have illustrated in dotted lines at 16 such camouflage.

In Fig. 4 I have shown a modified form of knife-carrying means for such a snare and which comprises two arcuately shaped sections 17 and 18, the former acting as a supporting member for the latter and which has attached to the upper end thereof a suitable clevis 19 through which the snare wire 20 passes, the loop end of the wire being attached to the free end of the knife carrying section 18 in which a suitable hole 21 is provided for such purpose. The knife carrying section 18 is pivotally attached to the end of the section 17 as at 22 and a spiral spring is shown at 23 one end of which is hooked around the body portion of the section 17 and passed spirally about the head of the bolt, forming the pivotal connection 22 and thence to the bolt or tap-screw 24 which holds the adjacent sticking knife 25 to the section 18.

A second sticking knife 26 is shown as similarly bolted to the section 18. When the loop in the snare is engaged by the neck of an animal it is evident that the two sections 17 and 18 will readily jack-knife and cause the sticking knives to function and quickly extinguish the life of the animal engaged by bleeding same.

From careful consideration of the foregoing it is evident that I have devised means for aiding in the extinction of predatory animals and the like, which, upon first consideration may seem to involve elements of cruelty, but in fact is designed with just the opposite intent and which in action has proven to remove from such method of catching animals the objectionable feature of cruelty, as without fail, death results almost immediately to any animal caught in one of my improved snares.

It is furthermore evident that various modifications within the scope of the appended claims may be resorted to without departing from the invention.

What I claim is:

1. The combination with a slip noose of an inwardly projecting sharpened instrument whereby when an animal is engaged by the noose the instrument will be caused to stick and bleed the same.

2. A slip noose of the character described having a portion thereof carrying an inwardly projecting sticking blade for the purpose described.

3. A slip noose of the character described having in cooperative engagement therewith an inwardly projecting cutting blade for the purpose described.

4. The combination with a snare wire of the character described of a plurality of pivotally united sections, one or more knife blades carried by the sections and a clevis carried upon the free end of the sections through which the wire is passed in forming a slip noose for a snare.

5. A slip noose of the character described comprising a plurality of pivotally united blade carrying links, a wire attached to one end of the linked sections and passing through a clevis at the other end of the linked sections and a spring wire cooperatively attached to the sections for holding the united series thereof in arcuate form, substantially as and for the purpose described.

6. The combination with a snare of the character described having a depending knife carrying arcuately disposed linked section, of means whereby a twig or branch may be suspended for disguising said section.

7. The combination with a linked section for snares of the character described, of thin sharpened cutting blades forming cooperative parts of the links of said section, substantially as described.

In testimony whereof I hereunto affix my signature in the presence of two witnesses.

NORMAN D. FAIRBANKS.

Witnesses:
ELLEN THEORIN,
S. GEO. STEVENS.